United States Patent [19]
Hara et al.

[11] 3,958,083
[45] May 18, 1976

[54] ACQUISITION SYSTEM FOR THE SDMA/TDMA SATELLITE COMMUNICATION SYSTEM

[75] Inventors: Takao Hara, Yokohama; Yoshikazu Tsuji, Kawasaki; Yasuhiko Sakamoto, Fujisawa, all of Japan

[73] Assignee: Fujitsu Ltd., Japan

[22] Filed: Feb. 21, 1975

[21] Appl. No.: 551,675

[30] Foreign Application Priority Data
Feb. 26, 1974 Japan.............................. 49-22619
Feb. 26, 1974 Japan.............................. 49-22621

[52] U.S. Cl. ..................... 178/69.5 R; 179/15 BS; 325/4; 325/58
[51] Int. Cl.² ......................... H04J 3/06; H04B 7/20
[58] Field of Search ............ 178/69.5 R; 179/15 BS; 343/100 ST; 325/4, 58, 156–158

[56] References Cited
UNITED STATES PATENTS

| | | | |
|---|---|---|---|
| 3,530,252 | 9/1970 | Puente | 179/15 BS |
| 3,562,432 | 2/1971 | Gabbard | 179/15 BS |
| 3,566,268 | 2/1971 | Webb | 178/69.5 R |
| 3,812,430 | 5/1974 | Schmidt et al. | 178/69.5 R |
| 3,813,496 | 5/1974 | Maillet | 179/15 BS |
| 3,879,580 | 4/1975 | Schlosser et al. | 179/15 BS |

Primary Examiner—Malcolm A. Morrison
Assistant Examiner—Errol A. Krass
Attorney, Agent, or Firm—Staas & Halsey

[57] ABSTRACT

An acquisition system for the SDMA/TDMA satellite communication system is disclosed in which a synchronization signal receiving time slot and a plurality of data signal receiving time slots, for communication between predetermined groups of earth stations and between the earth stations of each group, are sequentially provided at the satellite based on timing signal in the satellite. An acquisition signal having a plurality of signal burst portions is transmitted from the earth station, with its transmit time slot being shifted in a first sweep mode until one part of the acquisition signal is received by said transmitting earth station. At that time the transmit time slot is shifted in a second sweep mode, whereby a control is made to obtain synchronization of the earth station with the satellite so that the plurality of burst portions in the acquisition signal may be properly communicated to the predetermined groups.

Further, an acquisition control is shown to be effectively achieved in the case where the SN ratio of the received acquisition signal is extremely deteriorated or where it is necessary to prevent disturbing another earth station of the same group of earth stations which has already accessed the satellite.

3 Claims, 16 Drawing Figures

ACQUISITION SYSTEM FOR THE SDMA/TDMA SATELLITE COMMUNICATION SYSTEM

BACKGROUND OF THE INVENTION

1. Field of the Invention

This invention relates to an acquisition system in an SDMA/TDMA satellite communication system.

2. Description of the Prior Art

Strictly speaking, the SDMA/TDMA satellite communication system is referred to as SDMA/SS-TDMA (Space Division Multiple Access/Spacecraft Switched-Time Division Multiple Access). This system is seen as a satellite communication system of large capacity based on the TDMA system.

With this system, a satellite carries a spot beam antenna which irradiates a relatively small zone, unlike a conventional spot beam antenna. Namely, each spot beam corresponds to one zone without interference with the other beams. The same frequency is employed in common to the respective spot beams and multiple access is achieved. The satellite contains a swithing matrix having respective inputs and outputs corresponding to the spot beam zones. The transmission and reception of signals are achieved among the spot beam zones in accordance with a time sequence predetermined by a clock of a reference oscillator incorporated in the satellite. Further, in each spot beam zone, access is effected on the conventional TDMA system.

FIG. 1 shows a basic model of the SDMA/TDMA satellite communication system (hereinafter referred to as the SDMA/TDMA system, for the sake of brevity).

In FIG. 1, reference numeral 1 indicates a satellite having a switching function; 2 designates a timing signal generator source on the satellite 1; 3 identifies a switching circuit shown in a matrix form; 4 to 9 denote high-directivity antennas; and 10 to 12 represent earth station groups belonging to spot beam zones No. 1 to No. 3, respectively.

The switching circuit 3 is adapted to switch time slots in accordance with a time frame construction as shown in FIG. 2A by a timing signal supplied from the timing signal generator source 2. As shown in FIGS. 2A and 2B, a No. 1 data window of such frame construction, provides a transmitted signal from an earth station of the No. 1 zone (10) to be switched to an earth station of the No. 3 zone (12); a transmitted signal from an earth station of the No. 2 zone (11) is switched to an earth station of the No. 1 zone (10); and a transmitted signal from an earth station of the No. 3 zone (12) is switched to an earth station of the No. 2 zone (11). In a No. 2 data window, signals are switched to be transmitted from the earth station of the No. 1 zone (10) to that of the same zone (10), from the earth station of the No. 2 zone (11) to that of the same zone (11) and from the earth station of the No. 3 zone (12) to that of the same zone (12). Further, in a No. 3 data window, signals are switched to be transmitted from the No. 1 zone (10) to the No. 2 zone (11), from the No. 2 zone (11) to the No. 3 zone (12) and from the No. 3 zone (12) to the No. 1 zone (10). Another sync window is provided and, in its time slot, transmitted signals from the No. 1, No. 2 and No. 3 zones (10, 11 and 12) are switched so as to be respectively returned to them, and are used for synchronization of the earth stations with the satellite.

As described above, the switching circuit 3 in the satellite 1 sequentially changes the respective predetermined time slots. Therefore, for proper communication between the earth stations, it is necessary to correctly synchronize with a desired time slot. Accordingly, in the case where a certain earth station starts transmission, it is especially important to achieve an acquisition control by synchronizing the timing of the earth station with that of the satellite.

SUMMARY OF THE INVENTION

One object of this invention is to provide a system with which it is possible to effectively perform an acquisition control for synchronizaton of the timing of a satellite with that of an earth station in the SDMA/TDMA system.

Another object of this invention is to provide a system for effectively achieving an acquisition control in the case where the signal to noise (SN) ratio of a received acquisition signal is greatly deteriorated.

According to the acquisition system of this invention, the SDMA/TDMA system provides a synchronization signal receiving time slot and a plurality of data signal receiving time slots, for communication between predetermined earth station groups and between earth stations of one group, which are sequentially changed based on a timing signal in a satellite. An acquisition signal having a plurality of signal burst portions is transmitted from the aforesaid earth station, with its transmission time slot being shifted in a first sweep mode. When one part of the above acquisition signal is received, by the same earth station, the following acquisition signals are transmitted, with their transmission time slots shifted in a second sweep mode. The acquisition control to synchronize the earth station with the satellite is thereby effected so that the aforesaid plurality of burst portions in the acquisition signal may be properly communicated to the predetermined groups.

Further, in the case where the SN ratio of the received acquisition signal is extremely deteriorated or where access by a first earth station to the satellite is prevented from disturbing another earth station of the same group having already accessed the satellite, a reference time slot in which the aforesaid acquisition signal will be received at the first earth station is established. During this reference time slot, the received signal is sampled by a plurality of sampling clocks and the sampling result is integrated for a plurality of frames. If an acquisition signal is being received during the reference time slot, the width of reception of the acquisition signal is determined and, based on the reception width, an acquisition control is effected to obtain synchronization of the earth station with the satellite.

DESCRIPTION OF THE PREFERRED EMBODIMENTS

The acquisition control of this invention is effected in the first case wherein a first earth station of one zone accesses a satellite and in the second case where such access is made at the state that one or more earth stations of the same zone have already accessed the satellite.

The following description is given first discussing of the former case and then the latter.

Figure 1:
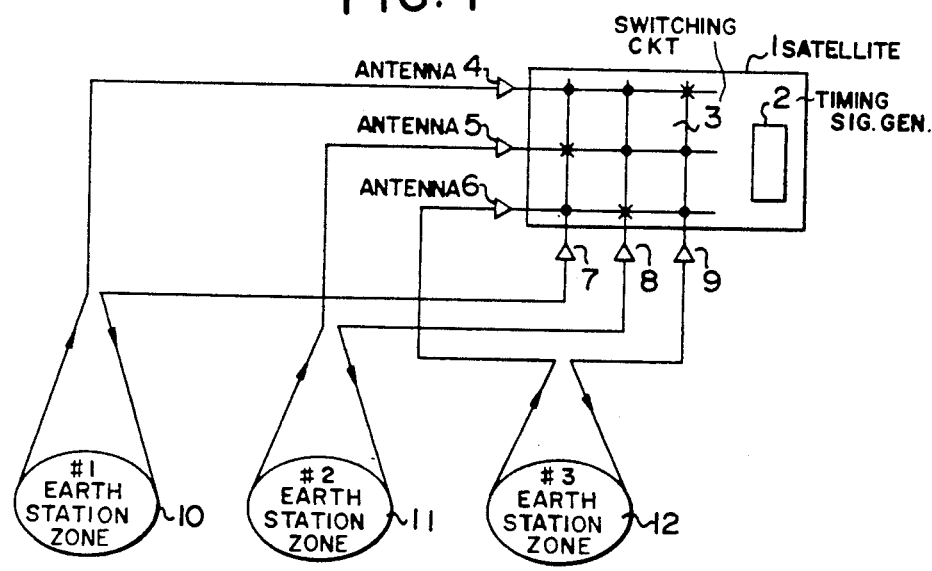
FIG. 1 is a diagram for generally explaining the SDMA/TDMA satellite communication system to which this invention is applied.
Figure 2:
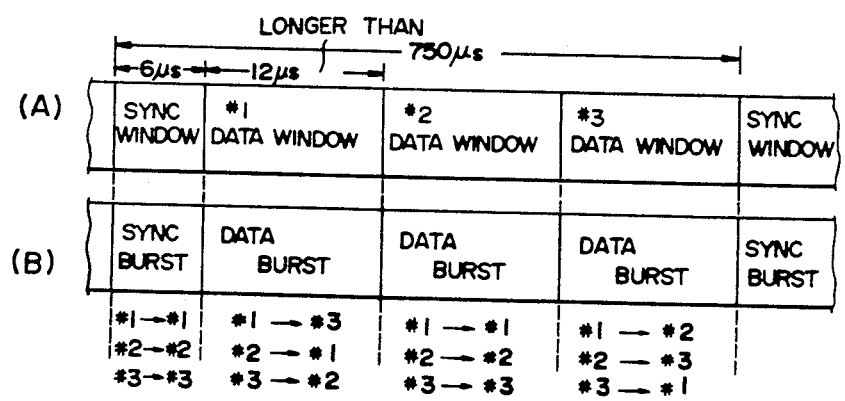
FIGS. 2A and 2B show examples of time frame structures for use in the SDMA/TDMA communication system.
Figure 3:
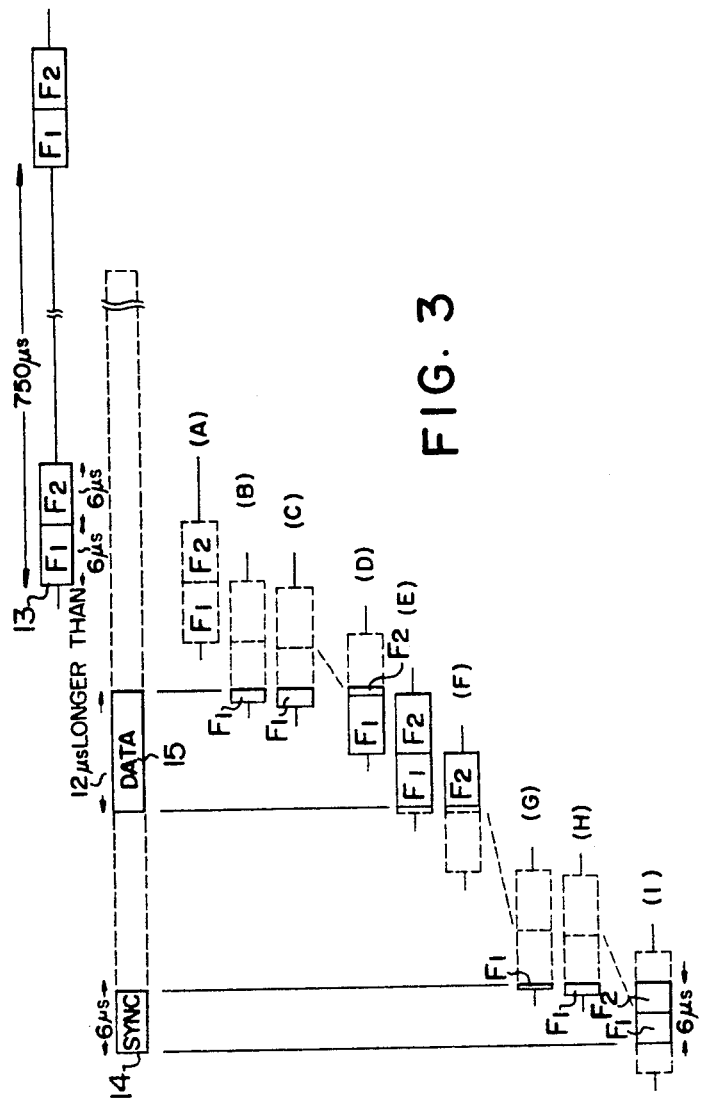
FIG. 3 is a diagrammatic representation of principles for acquisition control according to this invention.

FIG. 3 is a diagrammatic showing of the acquisition control according to this invention. In FIG. 3, reference numeral 13 indicates a transmitted acquisition signal for use in this invention, which is composed of a burst signal of a frequency $F_1$ transmitted for the same period of time (6 $\mu$s) as the sync window of the satellite shown in FIG. 2, and a burst signal of a frequency $F_2$ and similarly transmitted for 6 $\mu$s. Reference numeral 14 designates the sync window of the satellite, which is the time slot in which a transmitted signal from a certain earth station is returned to the zone to which the earth station belongs. Reference numeral 15 identifies the No. 2 data window shown in FIG. 2, which is a time slot of at least 12 $\mu$s and in which a transmitted signal from a certain earth station is also returned to the zone to which the earth station belongs.

Assuming that a certain earth station transmits the acquisition signal 13 for the acquisition control, it is impossible to predict which phase relation the acquisition signal 13 will have on the satellite when it has reached the satellite. Accordingly, there are some occasions when the acquisition signal is completely displaced in phase, as shown in FIG. 3A, and cannot be received at the earth station. If such an occasion occurs in the present invention, the earth station transmits the acquisition signal 13 while greatly (for example, 6 $\mu$s) shifting the transmitting timing in accordance with a first sweep mode as shown by comparing FIG. 3A, to FIG. 3B. Thereafter, the transmitting timing is similarly shifted in accordance with the first sweep mode until one part of the acquisition signal 13 is received as depicted in FIG. 3B. The earth station then switches the timing shaft of the acquisition signal 13 to a second sweep mode to shift the transmitting timing (for example, by 0.3 $\mu$s) as shown in FIGS. 3C and 3D.

If the entire part of the acquisition signal 13 is received in a time slot longer than 6 $\mu$s, as shown in FIG. 3D, it implies that the signal is captured in the No. 2 data window, depicted in FIG. 2. The earth station again switches the timing shift to the first sweep mode to shift the transmitting timing by 6 $\mu$s (FIGS. 3E, 3F and 3G).

Then, when one part of the acquisition signal 13 is received again, as shown in FIG. 3G, and the earth station is switched to the second sweep mode (FIGS. 3H and 3I). During shifting in the second sweep mode, when the burst signal of the frequency $F_1$ is received for 3 $\mu$s and the burst signal of the frequency $F_2$ is similarly received for 3 $\mu$s, the transmitted acquisition signal 13 is correctly synchronized with respect to the sync window 14 having the time slot of 6 $\mu$s. This implies that the earth station and the satellite are correctly synchronized with each other. Then, the acquisition control is finished and, thereafter, a synchronization signal is transmitted to thereby watch the synchronization thus obtained.

In the SDMA/TDMA system, the acquisition control is achieved as described above with regard to FIG. 3. However, in the case where the SN ratio is extremely deteriorated or where the acquisition signal is restricted to such a low-level signal as not to disturb the reception of any other earth stations of the same zone which have already accessed the satellite, there are some occasions where it is extremely difficult to directly determine the pulse width by the use of an output obtained by square detection of the received acquisition signal.

Figure 4:
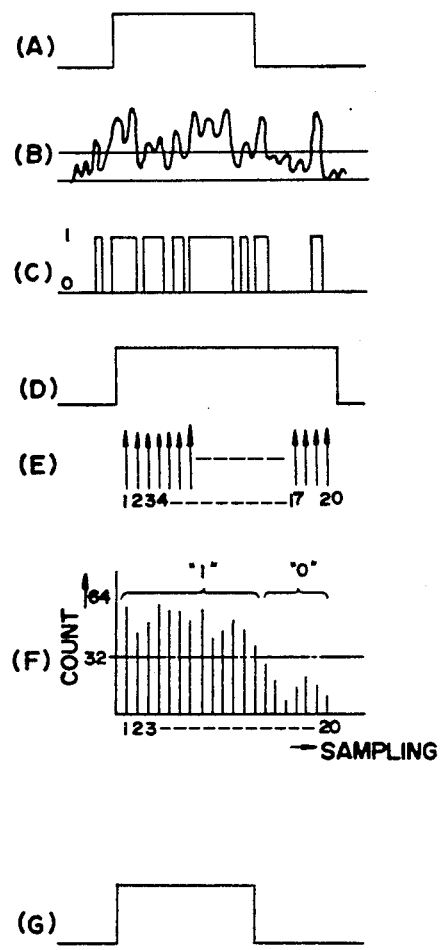
FIGS. 4A to 4G are explanatory diagrams schematically showing one example of processing a received signal during a reference time slot for determining the received pulse width of an acquisition signal according to this invention.

To avoid this, the present invention employs a process as diagramatically shown in FIG. 4 for correctly determining the received pulse width of the acquisition signal.

Assuming that a signal of a pulse width as depicted in FIG. 4A is to be obtained but in practice the signal received is in a form such as is shown in FIG. 4B wherein the signal to noise power ratio is deteriorated. The received figure is clipped at a certain threshold level and the signal of FIG. 4B becomes similar to that shown in FIG. 4C. As illustrated in FIG. 4D, a reference time slot is provided in which the acquisition signal will be received, and the signal of FIG. 4C obtained in the reference time slot is sampled by a plurality of sampling clocks.

By sampling the signal of FIG. 4C as mentioned above, a sample signal of a level "1" or "0" is produced for each clock depending upon the presence or absence of the signal. The result of sampling one frame becomes such as stated above. However, by sampling, for example, 64 frames and integrating those samplings an accumulated result, as shown in FIG. 4F, is obtained. Assuming that the pulse width depicted in FIG. 4A is one that is to be originally obtained, the possibility is greater that a signal level of 1 is obtained at the sampling clock instant corresponding to the pulse width as compared with other instants. Accordingly, by providing such a sampling clock instant that the accumulated result is above a mean value as shown in FIG. 4F, a pulse width as shown in FIG. 4G is obtained. This pulse width is to be naturally coincident with that shown in FIG. 4A and this pulse width is regarded as the received pulse width of the acquisitions signal.

Based upon the received pulse width, an acquisition control as described with FIG. 3 is effected.

Figure 5:
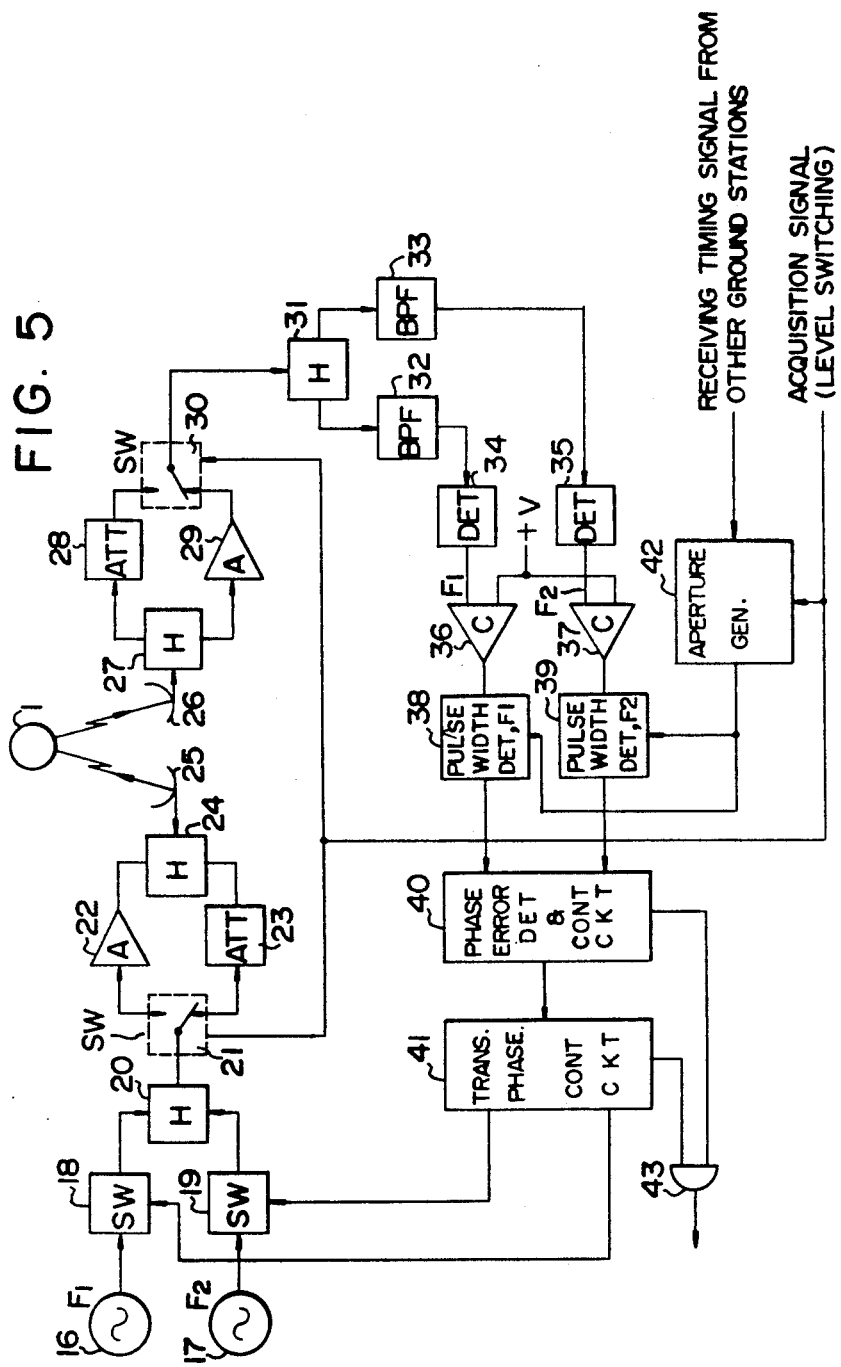
FIG. 5 is a block diagram illustrating one example of an earth station for achieving the processings diagramatically shown in FIGS. 3 and 4.

FIG. 5 is a block diagram illustrating one example of the earth station which performs the processings diagramatically shown in FIGS. 3 and 4. In FIG. 5, reference numerals 16 and 17 indicate oscillators; 18 and 19 designate switching circuits; 20 denotes a hybrid circuit; 21 identifies a changeover switch; 22 represents an amplifier; 23 shows an attenuator; 24 refers to a hybrid circuit; 25 and 26 indicate antennas; 27 designates a hybrid circuit; 28 represents an attenuator; 29 denotes an amplifier; 30 identifies a changeover switch; 31 shows a hybrid circuit; 32 and 33 refer to band-pass filters; 34 and 35 indicate detectors; 36 and 37 designate comparators; 38 and 39 identify pulse width detectors; 40 denotes a phase error detect and control circuit; 41 represents a transmit phase control circuit; 42 shows an aperture generator circuit; and 43 refers to an AND gate circuit.

As an example, in the case where a second earth station of the same zone has already accessed the satellite, as mentioned previously, an acquisition signal is suppressed to a low level and transmitted by a first earth station so as not to disturb the second earth station. To this end, in FIG. 5, an acquisition signal level switching signal is produced and the switches 21 and 30 are set at their lower sides. At the same time, a receiving timing signal of the second earth station is received and, based on this receiving timing signal, the aperture generator circuit 42 is controlled to produce an aperture (FIG. 4D), which is supplied to the pulse width detectors 38 and 39.

In this state, a signal of a frequency $F_1$ derived from the oscillator 16 is applied by the switching circuit 18 to the hybrid circuit 20 for 6 μs. Then, a signal of a frequency $F_2$ derived from the oscillator 17 is applied by the switching circuit 19 to the hybrid circuit 20 for 6 μs. The burst signal (13 in FIG. 3) is composed of these two continuous signals of different frequencies and is transmitted to the satellite 1 through the switching circuit 21, the attenuator 23, the hybrid circuit 24 and the antenna 25, after having its transmission level lowered. Namely, the burst signal is transmitted after its level is lowered so as to prevent disturbing the second earth station. A signal from the satellite 1 is received by the antenna 26 and applied to the hybrid circuit 31 through the hybrid circuit 27, the amplifier 29 and the switch 30. Even after being amplified by the amplifier 29, the received signal has a deteriorated SN ratio, as depicted in FIG. 4.

The component of the frequency $F_1$ of the received signal, which has such a deteriorated SN ratio, is detected through the filter 32 and the detector 34. The component of the frequency $F_2$ is similarly detected through the filter 33 and the detector 35. The detected outputs are applied to the comparators 36 and 37, respectively, by which it is checked whether the detected signal levels are above predetermined threshold levels or not, respectively (that is, the outputs from the comparators take such a waveform as depicted in FIG. 4C).

The output waveforms are applied to the pulse width detectors 38 and 39, respectively, and detected thereby in their pulse widths. In this case, the pulse width detectors 38 and 39 are both supplied with the aperture and adapted to perform such processing as described previously in connection with FIG. 4.

The pulse widths thus detected are applied to the phase error detect and control circuit 40 to examine a phase error. Until the acquisition signal is received in a correct phase relation as explained previously with regard to FIG. 3, the transmit phase control circuit 41 is controlled to shift the acquisition signal transmitting timing in the first or second sweep mode. When the acquisition signal is received in a correct phase relation, the AND gate circuit 43 is turned on to produce a synchronization signal.

When the acquisition signal can be transmitted at a high level, the switches 21 and 30 are changed over to their upper sides. Also in this case, it is possible to provide an aperture and achieve such processing as described previously with respect to FIG. 4.

Figure 6:
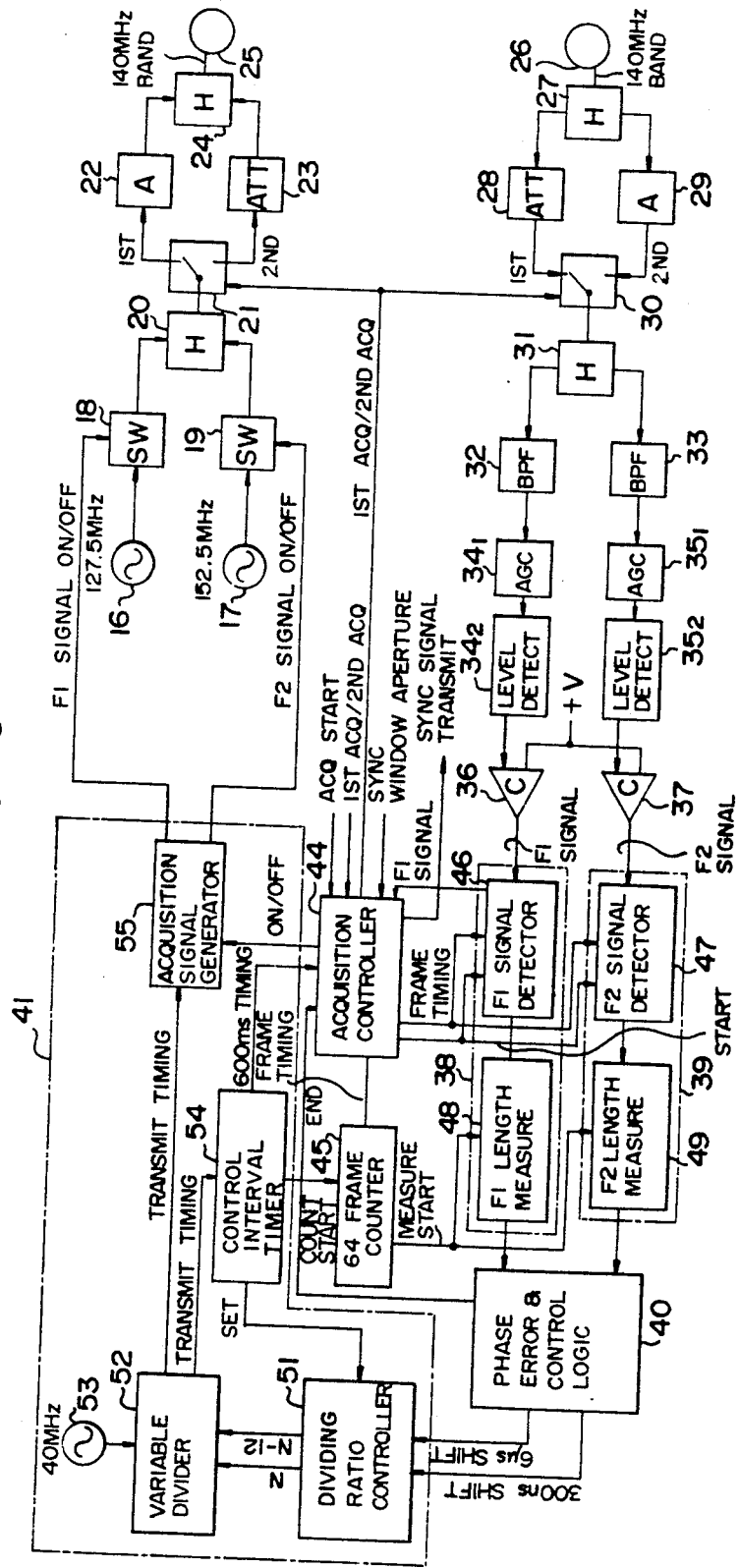
FIG. 6 is a detailed block diagram of the construction depicted in FIG. 5.
Figure 7:
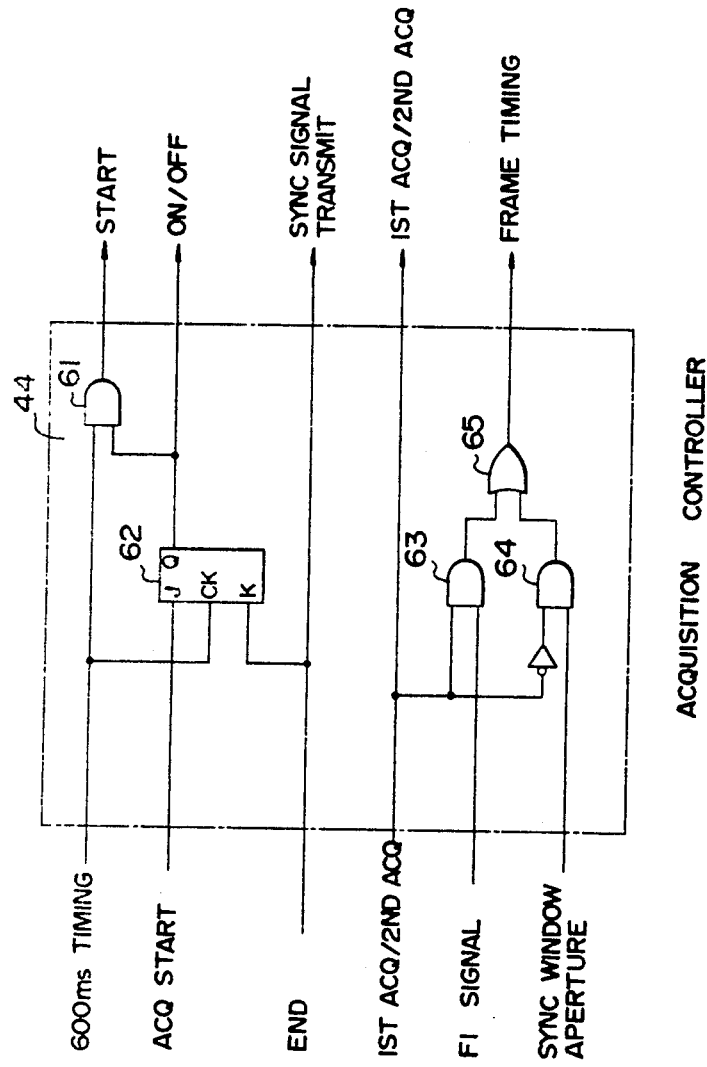
FIG. 7 shows a detailed block diagram of an acquisition controller as shown in FIG. 6.
Figure 8:
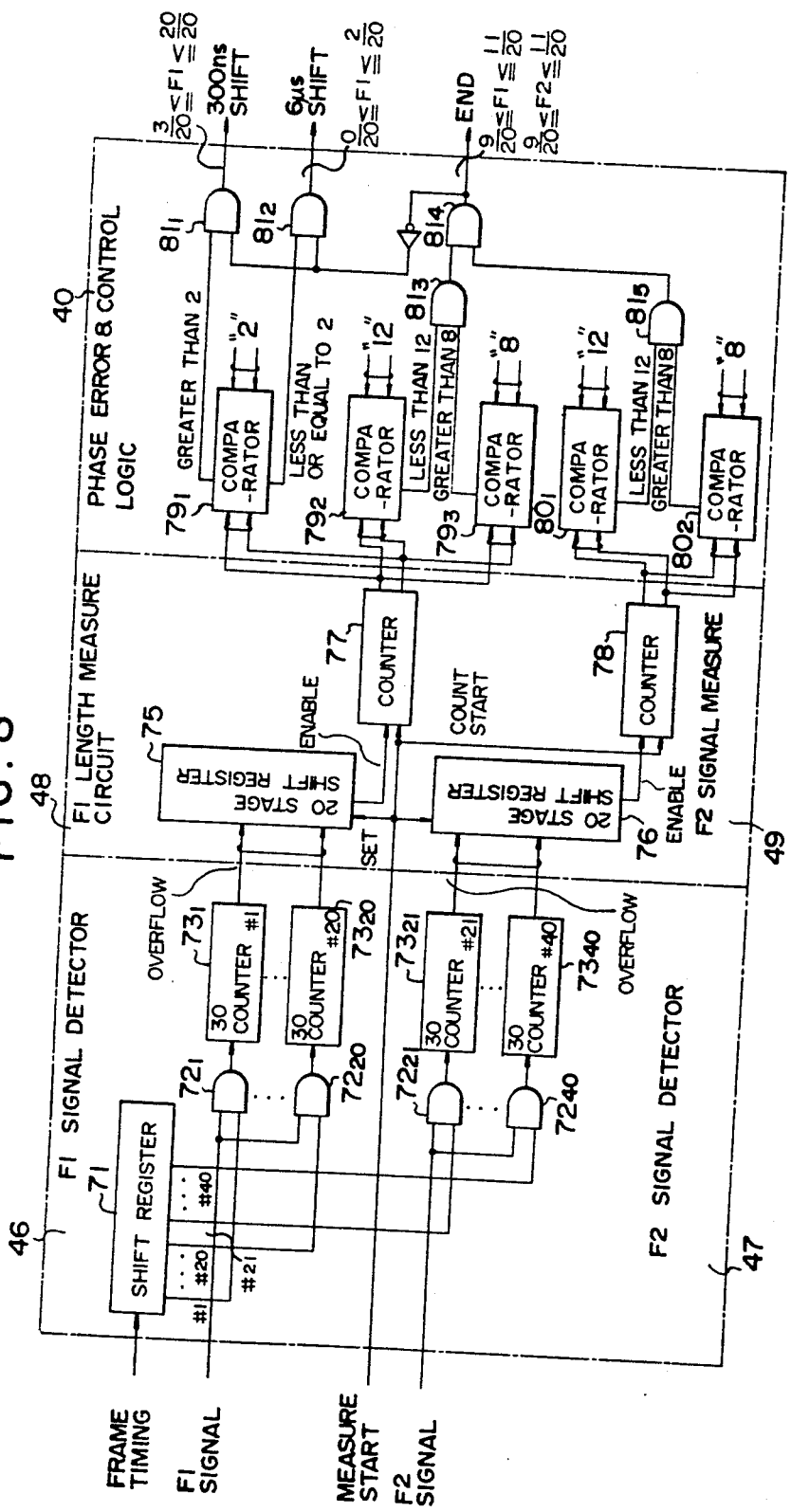
FIG. 8 shows a detailed block diagram of the pulse width detectors along with the phase error detector and control circuit as shown in FIGS. 5 and 6.
Figure 9:
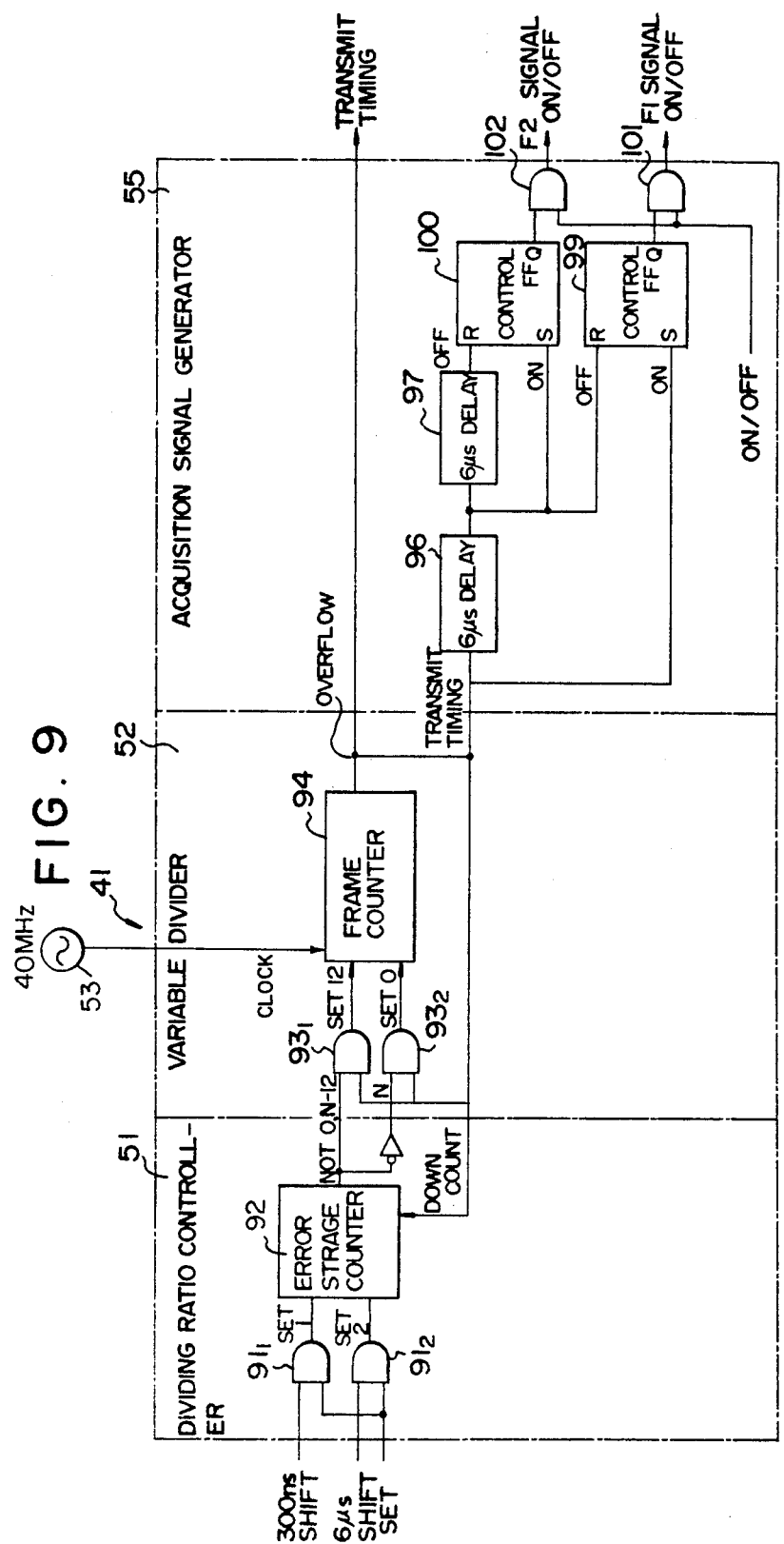
FIG. 9 shows a detailed block diagram of the transmit phase control circuit shown in FIGS. 5 and 6.

FIG. 6 is a detailed block diagram of the construction depicted in FIG. 5. FIGS. 7 to 9 each illustrate one example of each of circuits forming the principal part of FIG. 6.

In FIG. 6, signals $F_1$ and $F_2$ are derived from oscillators 16 and 17, whose frequencies are, for example, 127.5 MHz and 152.5 MHz, respectively. Signals $F_1$ and $F_2$ are switched by FSK switching circuits 18 and 19, respectively, to be supplied to the hybrid circuit 20 for 6 μs each. The output from the hybrid circuit 20 is switched by ganged switching circuits 21 and 30 in an acquisition mode, as is the case with FIG. 5. Namely, initial acquisition is started by designating one of the acquisition modes 1st ACQ/2nd ACQ to an acquisition controller 44. This circuit is omitted in FIG. 5 for the convenience of brevity of description. An acquisition start signal (hereinafter referred to as the ACQ start signal) is applied to the acquisition controller 44.

Upon reception of the ACQ start signal by the acquisition controller 44, a control flip-flop is activated to supply an ON/OFF signal in its ON state. The ON/OFF signal from the acquisition controller 44 is applied to an acquisition generator 55. The acquisition generator 55 generates ON/OFF control signals for the 6 μs wide signals $F_1$ and $F_2$ which are started by a transmit timing signal of a variable divider 52. The ON/OFF control signals are supplied to the switching circuits 18 and 19 to control their switching operation. The signals $F_1$(127.5 MHz) respectively and $F_2$(152.5 MHz) keyed by the switching circuits 18 and 19, are serially combined with each other in the hybrid circuit 20. The composite signal is distributed to the amplifier 22 (1st ACQ) or the attenuator 23 (2nd ACQ) through the switching circuit 21 positioned in accordance with the aforesaid acquisition modes. The distributed signals are combined together by the hybrid circuit 24 to produce a composite signal, which is an IF output signal, for example, of 140 MHz frequency band. The output is transmitted from the antenna 25 after being frequency converted. A signal reflected back from the satellite 1 and received by antenna 26, is frequency converted and becomes an IF signal of 140 MHz frequency band. The converted IF signal is applied to the hybrid circuit 27 and then applied to the hybrid circuit 31 through the attenuator 28 (1st ACQ) or the amplifier 20 (2nd ACQ) in accordance with the aforesaid acquisition modes and through the switching circuit 30. The signal thus applied to the hybrid circuit 31 is distributed to narrow-band pass filters 32 and 33 for passing respective the signals $F_1$ (127.5 MHz) and $F_2$ (152.5 MHz). The levels of the passed signals are made constant by AGC amplifiers $34_1$ and $35_1$ which compensate for input signal level changes. If the acquisition signals $F_1$ and $F_2$ are received, they are envelope detected by level detectors $34_2$ and $35_2$, after which they are checked by the comparators 36 and 37 to determine whether they are above predetermined threshold levels or not. Then, they are converted into logical levels and applied to $F_1$ and $F_2$ signal detectors 46 and 47 of the $F_1$ and $F_2$ pulse width detector circuits 38 and 39, respectively.

The above circuits have substantially the same constructions and functions as those marked with the same reference numerals in FIG. 5. In FIG. 6, details of circuit constructions are shown corresponding to those of the above-described circuits. A description of the pulse width detectors 38 and 39, the phase error detect and control circuit 40, the transmit phase control circuit 41, etc. follows.

Before describing the pulse width detectors 38 and 39, the construction and operation of the acquisition controller 44 for effecting the acquisition timing control with regard to them will be clarified. Referring to FIGS. 6 and 7, a timing signal of a period 600 ms from a control interval timer 54 is used as one input to an AND gate circuit 61 and as a clock of a JK flip-flop 62. The ACQ start signal from the outside and an end signal END from the phase error detect and control logic 40 (described later) are respectively applied to J and K terminals of the JK flip-flop 62. The Q output from the JK flip-flop 62 is used as an ON/OFF signal for an acquisition signal generator 55 and as the other input to the AND gate circuit 61. The output from the AND circuit gate 61 is used as a start signal for the pulse width detectors 38 and 39. The end signal END from the phase error detect and control logic 40 is used as a instruction of a sync signal transmitted.

Then, an acquisition mode (1st ACQ/2nd ACQ) selection signal is supplied from the outside and it is employed for controlling the switching circuits 21 and 30. Further, this mode selection signal is applied to an AND gate circuit 63 together with the signal $F_1$ from the $F_1$ signal detector 46 of the pulse detector. Moreover, an inverted output shunted from the acquisition mode selecting signal and a sync window aperture signal, which is supplied from a sync signal receiving section of the second earth station having already accessed the satellite, are both applied to an AND gate circuit 64. The outputs from these AND gate circuits 63 and 64 are supplied to an OR circuit 65 to obtain a logical sum. This output is applied as a frame timing to the $F_1$ and $F_2$ signal detectors 46 and 47 and to a 64-frame counter 45. Thus, the function of the aperture generator 42 shown in FIG. 5 is accomplished.

Turning back to FIG. 6, the outputs from the aforementioned comparators 36 and 37, that is, the signals $F_1$ and $F_2$, are respectively applied to the $F_1$ signal detector 46 and an $F_1$ length measure circuit 48 and to the $F_2$ signal detector 46 and an $F_2$ length measure circuit 49, of the pulse width detector circuits 38 and 39 surround by broken lines. Thus, the $F_1$ and $F_2$ signal detectors 46 and 47 are controlled by the frame timing signal from the aforesaid acquisition controller 44 and the $F_1$ and $F_2$ length measure circuits 48 and 49 are controlled by a measure start signal from the 64-frame counter 45, by which accurate pulse widths are detected in accordance with the principles previously explained with regard to FIG. 4. Then, the detected outputs are applied to the phase error detect and control logic 40.

FIG. 8 illustrates one example of each of the $F_1$ and $F_2$ signal detectors 46 and 47, the $F_1$ and $F_2$ length measure circuits 48 and 49 and the phase error detect and control logic 40.

In the $F_1$ and $F_2$ signal detectors 46 and 47, the frame timing signal from the acquisition controller 44 is supplied to a 40-bit shift register 71 to provide timing signals No. 1 to No. 40. The timing signals No. 1 to No. 20 are respectively gated through AND gate circuits $72_1$ to $72_{20}$ by the $F_1$ signal output from the comparator 36 and are applied to 30 counters (No. 1) $73_1$ to (No. 20) $73_{20}$ to detect the presence of the signal $F_1$ for each timing signal. The counters each count up corresponding to the presence of the signal $F_1$. In a similar manner, the timing signals No. 21 to 40 from the shift register 71 are respectively gated through AND gate circuits $72_{21}$ to $72_{40}$ by the $F_2$ signal output from the comparator 37 and are applied to 30 counters (No. 21) $73_{21}$ to (No. 40) $73_{40}$ to count up the counters. When the counters $73_1$ to $73_{20}$ and $73_{21}$ and $73_{40}$ count up to 30, they generate overflow signals. Each time the start signal from the acquisition controller 44 is supplied, the $F_1$ and $F_2$ signal detectors 46 and 47 reset the 30 counters $73_1$ to $73_{40}$ and repeat the above operations.

When the $F_1$ and $F_2$ length measure circuits 48 and 49 receives the measure start signal from the 64-frame counter 45, information on the abovesaid overflow from the 30 counters $73_1$ to $73_{20}$ (No. 1 to No. 20) and $73_{21}$ to $73_{40}$ (No. 21 to No. 40) is applied to each of 20-stage shift registers 75 and 76, and the numbers of bits of the overflow are respectively counted by counters 77 and 78. The outputs from the counters 77 and 78 indicate the lengths of the signals $F_1$ and $F_2$, respectively. In the phase error detect and control logic 40 of the succeeding stage, the output from the counter 77 is compared with threshold values 2, 12 and 8 in respective comparators $79_1$, $79_2$ and $79_3$. An output larger than 2 is applied to an AND gate circuit $81_1$; an output smaller than or equal to 2 is applied to an AND gate circuit $81_2$; and an output smaller than 12 but larger than 8 is applied to an AND gate circuit $81_4$ through an AND gate circuit $81_3$. Then, the output from the counter 78 is compared with threshold values 12 and 8 in respective comparators $80_1$, and $80_2$. An output smaller than 12 but larger than 8 is applied to an AND gate circuit $81_5$. The output from the AND gate circuit $81_5$ is applied to the other input of the AND gate circuit $81_4$. An inverted output from the output of the AND gate circuit $81_4$ is applied to the other inputs of the AND gate circuits $81_1$ and $81_2$. Thus, if the length of the signal $F_1$ is $\leq 2/20$, a shift signal of 6 $\mu$s is derived from the AND gate circuit $81_2$. However if $9/20 = \leq F_1 \leq 11/20$ and if $9/20 \leq F_2 \leq 11/20$, an END signal is derived from the AND gate circuit $81_4$. In this manner, switching of the shift signal is achieved in accordance with the principles previously described with respect to FIG. 3.

Turning back to FIG. 6 again, the shift signals of 300 ns and 6 $\mu$s, which are outputs from the phase error detect and control logic 40, are shown as fed to the dividing ratio controller 51 of the transmit phase control circuit 41. By referring to FIGS. 6 and 9, a set timing signal is shown to be applied from a control interval timer 54 to an error storage counter 92 forming the principal part of the dividing ratio controller 51. Phase shift signals N and N-12 are applied to a frame counter of a variable divider 52 connected to a 40 MHz oscillation source 53. Until the error storage counter of the dividing ratio controller 51 is counted down to zero, a phase shift of 12 symbols, that is, 300 ns, is effected at 40 MHz per frame to count it down one by one. Thereafter, an overflow signal is applied as a transmit timing signal to the aforesaid control interval timer 54 and to an acquisition signal generator 55, by which the ON/OFF signals for the signals $F_1$ and $F_2$ can be gated to the switching circuits 18 and 19 after being delayed for a predetermined period of time. Further, the END signal derived from the phase error detect and control logic 40 is fed to the acquisition controller 44 to put the ON/OFF signals to the OFF state to stop transmission of the acquisition signal and thus terminate the initial acquisition. At the same time, a sync signal transmit signal is transmitted from the acquisition controller 44 to a sync signal transmitting section to start transmission of a sync signal.

FIG. 9 shows one example of each of the dividing ratio controller 51, the variable divider 52 and the acquisition signal generator 55 which corresponds to the transmit phase control circuit 41 in FIG. 5.

In the dividing ratio controller 51, the shift signals of 300 ns and 6 µs, supplied from the phase error detect and control logic 40 of the preceding stage are respectively applied to AND gate circuits $91_1$ and $91_2$, along with the set timing signal from the control interval timer 45 to produce set signals SET1 aND SET20, which are set in an error storage counter 92. Namely, a phase shift of 300 ns is achieved once or 20 times.

Next, at the stage of the variable divider 52, the output from the error storage counter 92 and its inverted output are applied respectively through AND gate circuits $93_1$ and $93_2$ to a frame counter 94 connected to a 40-MHz oscillation source 95. The output from the frame counter 94 is shunted to be fed back to the other inputs of the AND gate circuits $93_1$ and $93_2$ and to the error storage counter 92. Consequently, a phase shift of the frame counter 94 is effected through the AND gate circuit $93_1$ by an N-12 signal of 12 symbols, i.e. 300 ns at 40 MHz per frame and each time such a phase shift is achieved, the error storage counter 92 is counted down one by one. Thus, until the content of the frame counter 92 is counted down to zero, the frame storage counter 94 applies an overflow signal to the acquisition signal generator 55 and the control interval time 54.

In the acquisition signal generator 55, a transmit timing signal, which is the output from the frame counter 94, is applied to two series-connected 6-µs delay circuits 96 and 97 and the outputs across them are applied to set and reset terminals of control flip-flop 99 and 100. The Q outputs from these flip-flops 99 and 100 are respectively applied to AND gate circuits 101 and 102. At the same time, an ON/OFF signal is also applied to AND gate circuits 101 and 102 from the acquisition controller 44. The ON/OFF signal is put in the ON state by an ACQ start signal from the outside in order to derive, from the outputs of the AND gate circuits 101 and 102, the ON/OFF signals of 6 µs for the signals $F_1$ and $F_2$, respectively.

Further, in the case where the END signal is generated, the acquisition controller 44 puts the ON/OFF signal to the OFF state to stop transmission of the acquisition signal and, at the same time, applies the sync signal transmit signal to the sync transmission of the sync signal, thus terminating the initial acquisition.

According to the foregoing discussion of the present invention, when two signals of the frequencies $F_1$ and $F_2$ are each received for the same period of time (i.e. 3 µs, as shown in FIG. 3), so that the detection is easy and highly accurate detection is easily performed. Further, since the acquisition signal is shifted according to the suitably switched first or second sweep mode, the time for acquisition control is shortened. Moreover, depending upon whether or not the two signals of different frequencies are received for more than 6 µs in all, it can be known whether the acquisition signal is captured by the sync window or by the No. 2 data window. Therefore, no error is likely to be introduced into synchronization.

Further, according to this invention, as described with regard to FIG. 4, where the SN ratio of the received acquisition signal is extremely deteriorated, an acquisition control for correct synchronization can still be effected. This is of particular utility when consideration must be paid to disturbance to another earth station.

It will be apparent that many modifications and variations may be effected without departing from the scope of the novel concepts of this invention.

What is claimed is:

1. An acquisition system for a SDMA/TDMA satellite-earth station communication system in which a satellite provides a synchronization signal receiving time slot sequential with a plurality of data signal receiving time slots, for returning synchronization signals transmitted from earth stations to their respective earth stations and for effecting communication between predetermined groups of earth stations and between the earth stations of each group, based on a timing signal of said satellite, wherein an earth station of said system comprises:

means for transmitting an acquisition signal in a transmit time slot, said acquisition signal is composed of a plurality of signal burst portions, and said transmitting means includes means for shifting said transmit time slot in a selected sweep mode;

means for receiving said acquisition signal returned from said satellite, said receiving means includes a phase error detection means for detecting and measuring the amount of phase error between said received acquisition signal and said synchronization signal receiving time slot; and transmit phase control means for receiving said measured phase error and selecting said sweep mode from a plurality of sweep modes, whereby said transmit time slot is shifted in accordance with said measured phase error and synchronization is achieved between said transmit time slot of said earth station and said synchronization signal receiving time slot of said satellite.

2. An acquisition system as in claim 1, wherein said transmitting means includes means for generating said acquisition signal, said acquisition signal burst portions being different in frequency and equal in time length.

3. An acquisition system as in claim 1, wherein said receiving means further includes means for setting a reference time slot in which said acquisition signal is to be received when another earth station of the same group is accessing the satellite, means for sampling said received acquisition signal with a plurality of sampling clocks in said reference time slot and integrating the result of said sampling for a plurality of frames to determine the received width of said received acquisition signal, preceding said phase error detection means, wherein control is made to obtain synchronization of the earth station with the satellite based on the received width.

* * * * *

UNITED STATES PATENT OFFICE
CERTIFICATE OF CORRECTION

Patent No. 3,958,083   Dated May 18, 1976

Inventor(s) Takao Hara et al.

It is certified that error appears in the above-identified patent and that said Letters Patent are hereby corrected as shown below:

Column 3, line 17, "state that" should read -- time when --.

Signed and Sealed this

Fifth Day of October 1976

[SEAL]

Attest:

RUTH C. MASON
*Attesting Officer*

C. MARSHALL DANN
*Commissioner of Patents and Trademarks*